United States Patent
Kellstrom

[11] 3,963,285
[45] June 15, 1976

[54] CAGE CONTROL OF SKEW ANGLE IN ROLLER BEARINGS

[75] Inventor: Erik Magnus Kellstrom, Partille, Sweden

[73] Assignee: SKF Industries, Inc., King of Prussia, Pa.

[22] Filed: Oct. 9, 1973

[21] Appl. No.: 404,787

[52] U.S. Cl. .......................... 308/202; 308/207 R; 308/212; 308/215; 308/216; 308/217
[51] Int. Cl.² .................. F16C 19/00; F16C 13/00; F16C 33/58
[58] Field of Search ........... 308/212, 213, 214, 217, 308/218, 202, 207, 215

[56] References Cited
UNITED STATES PATENTS

| | | | |
|---|---|---|---|
| 3,290,103 | 12/1966 | Samitz | 308/217 |
| 3,687,511 | 8/1972 | Spauschus et al. | 308/207 |
| 3,802,754 | 4/1974 | Pitner | 308/217 |

Primary Examiner—M. H. Wood, Jr.
Assistant Examiner—Richard A. Bertsch
Attorney, Agent, or Firm—Howson and Howson

[57] ABSTRACT

A bearing comprising inner and outer members such as rings having inner and outer raceways spaced apart to define an annular space therebetween and a plurality of rolling elements in the annular space. A cage circumferentially spaces the rolling elements. Skew control means associated with the cage operates during operation of the bearing for a predetermined relative movement of the rings and rollers, to cause at least the rollers in the load zone to assume a nonnegative skew angle within a predetermined angular range. The rollers have a skew angle when the roller axis and the axis of the bearing are not coplanar. The skew angle is defined as being positive when the friction force components in the axial direction arising between the rollers and raceways and acting on a raceway are so directed that they counteract the axial load component of the external load acting on said raceway.

5 Claims, 6 Drawing Figures

CAGE CONTROL OF SKEW ANGLE IN ROLLER BEARINGS

The present invention relates to roller bearings and particularly to improvements in roller bearings providing for roller skew control.

More specifically, the present invention relates to roller bearings employing cage means or the like for guiding and spacing the rolling elements. Even though the present invention is illustrated and described in connection with a cylindrical roller bearing assembly, it is to be understood that the principle of cage means roller skew control has application to other types of bearings, for example, spherical and tapered roller bearings. In the operation of a conventional roller bearing assembly, the rollers contact other elements of the bearing, such as the outer and the inner ring and, in some instances, the cage or flanges on one of the rings. This contact produces friction points on the rollers whereby the rollers normally adopt an angle relative to the rolling direction whereby rolling and sliding in a direction parallel to the roller axis occurs at the same time. The angle which the rollers adopt is termed the skew angle and is defined as the angle between the axis of rotation of the roller and a plane normal to the path of relative motion of the raceways confronting the rollers. In annular roller bearings, the rollers are skewed when the axis of rotation of the roller and the axis of the bearing are not coplanar. In conventional roller bearing assemblies, the rollers tend to assume a negative skew angle that is, one wherein the friction force components in the axial direction arising between the rollers and the raceways an acting on a raceway are so directed that they do not counteract the axial component of the external load acting on said raceway. It has been found that negative skew angles result in higher friction and lower bearing life as compared with roller bearings in accordance with the present invention wherein the skew angle of the rollers is controlled so as to be zero or positive. Thus, it is a primary object of the present invention to provide roller bearings having a minimum amount of friction and a maximum service life over the broadest range of axial and radial load combinations, and this is achieved specifically in accordance with the present invention by means of skew control of the rollers by means of the cage.

More specifically, an object of the present invention is to provide roller skew control means associated with the cage wherein the sum of the moments acting on the rolling elements causes the rolling elements to assume a skew angle within a prescribed non-negative range. This object can be achieved by designing the bearing in such a way so that the so-called net skew moment of friction forces from the raceway contacts tending to negatively skew the rollers is balanced by the cage forces which induce a trimming moment opposing the raceway contact moments so that the operating skew angle of the rolling elements achieved upon equilibrium of the skew moments will be positive or zero.

These and other objects of the present invention and the various features and details of the operation and construction thereof are hereinafter more fully set forth with reference to the accompanying drawings, wherein.

Figure 2:
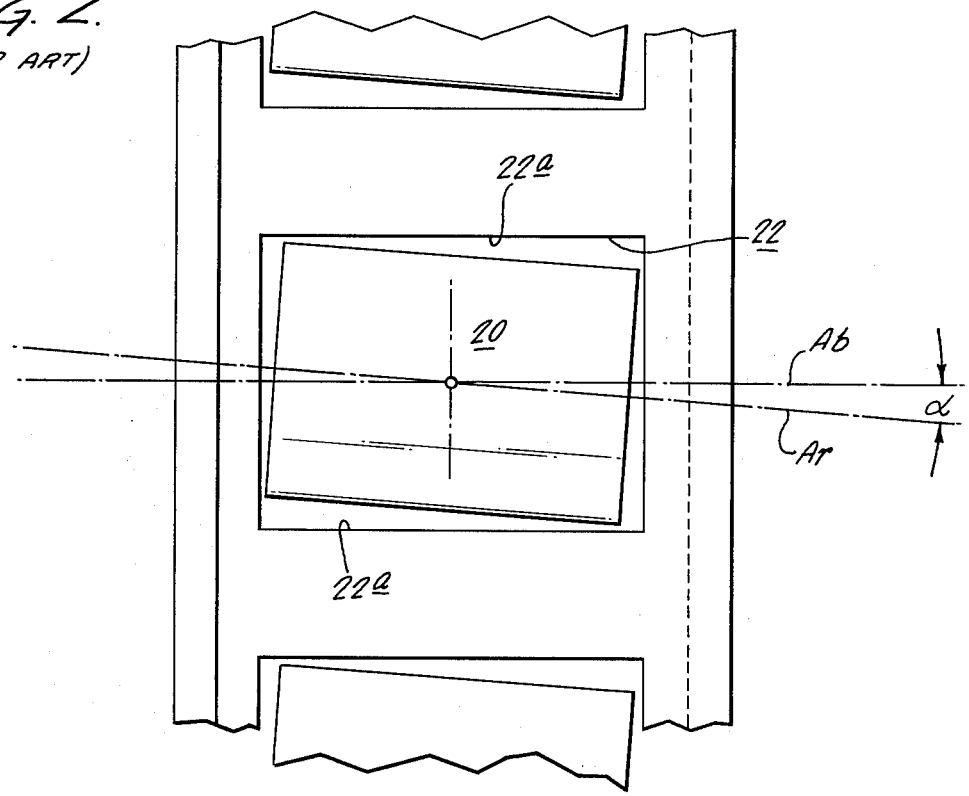
FIG. 2 is a fragmentary plan view showing a roller of the bearing assembly of FIG. 1 in a skewed position.
Figure 1:
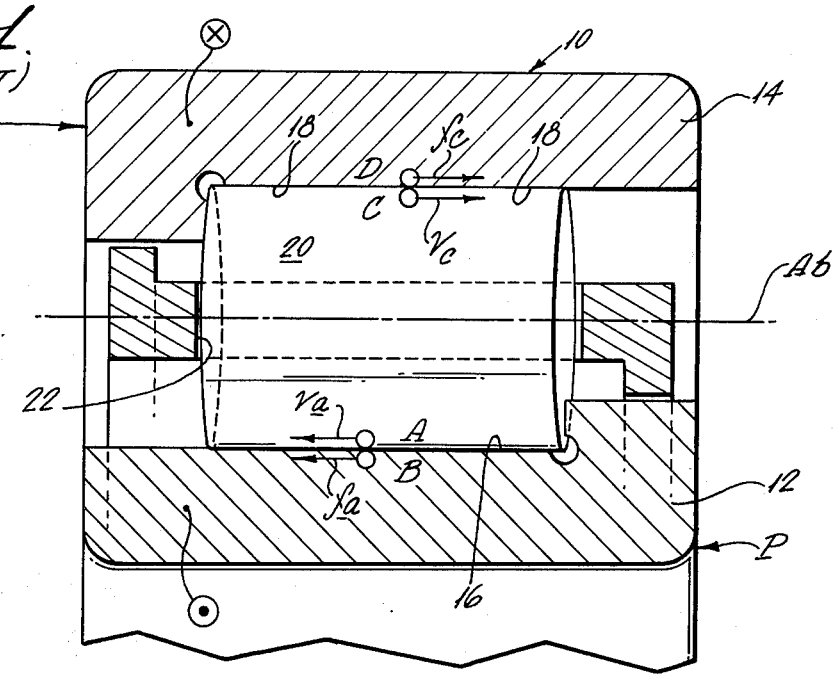
FIG. 1 is a sectional view of a conventional cylindrical roller bearing assembly.

There is illustrated in FIGS. 1 and 2 a conventional cylindrical roller bearing assembly generally designated by the numeral 10 and comprising inner and outer rings 12 and 14 respectively having confronting raceways 16 and 18 spaced apart to define an annular space for a plurality of rollers 20. The assembly further includes a conventional cage having circumferentially spaced pockets 22 for guiding and spacing the rollers 20. The cage pockets are generally parallel to the axis of the bearing $A_b$. In a conventional roller bearing of the type illustrated in FIGS. 1 and 2 there is a clearance between the cage pocket 22 and the rollers 20. Thus, under normal operating conditions with the rings 12 and 14 rotating in the relative directions indicated, each roller rotates about its axis $A_r$ in a counterclockwise direction and is in a skewed position. Because of the skew the roller surface will have a velocity component in the axial direction at its contact with the rings, for example, at points A and B and the velocity component $V_a$ of the roller at the inner ring, and the points C and D and the velocity component $V_c$ of the rollers at the outer ring. The rings have no such component. Therefore, axial friction forces $f_a$ and $f_c$ act on the inner and outer rings respectively. These friction forces are so directed that they do not counteract the axial load P carried by the rolling elements. Thus, the angle assumed by the rollers is defined as a negative skew angle $\alpha$. It is noted that if the direction or sign of the skew angle changes, the axial friction forces will change their direction. The skew angle axial component of the friction force acting on one of the raceways is so directed that they counteract the axial component of the externally applied load P acting on that raceway element.

Figure 4:
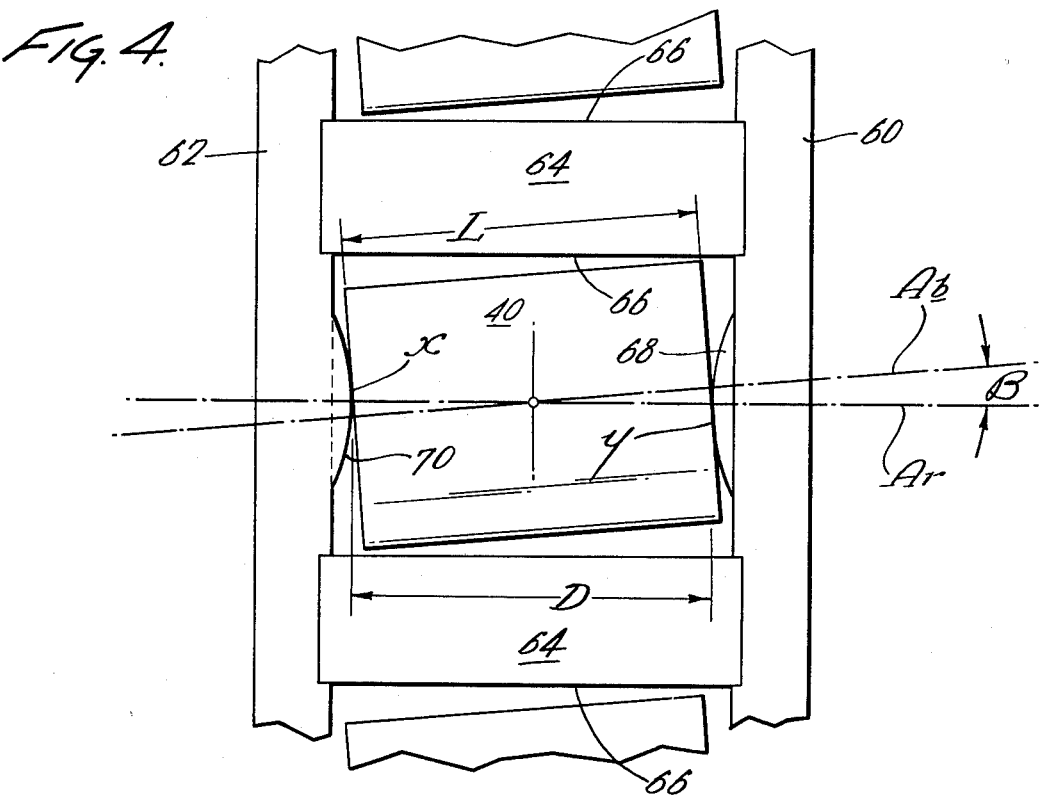
FIG. 4 is a fragmentary plan view showing a roller of the bearing assembly of FIG. 3 in a skewed position.
Figure 3:
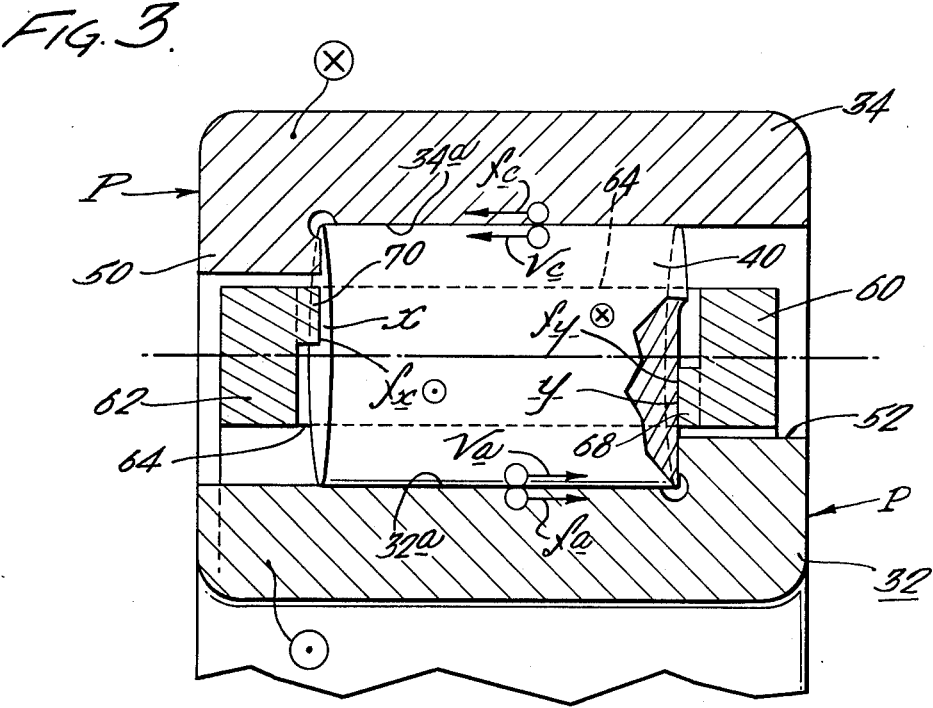
FIG. 3 is a sectional view of a cylindrical bearing assembly incorporating a first embodiment of cage skew control means.

Referring now to the drawings and particularly to FIGS. 3 and 4 thereof, there is illustrated a bearing assembly constructed in accordance with the present invention. The bearing assembly includes inner and outer ring members 32 and 34 having inner and outer raceways $32^a$ and $34^a$ respectively defining contact zones engagable by the rollers 40, in the present instance, cylindrical rollers. This bearing is adapted for accomodating an axial load and thus the outer ring includes an inwardly directed flange 50 located at one axial end and confronting the axial end face of the rollers and the inner ring 32 has a radially outwardly directed flange 52 confronting the opposite axial end faces of the rollers.

In accordance with the present invention, cage control means is provided for positioning the rollers at a positive or non-negative skew angle. More particularly, cage means is provided engagable with the rollers at predetermined locations during operation or the bearing to develop forces between the cage and rollers at the predetermined locations producing a positive skew of the rollers so that the friction force components in the axial direction arising between the rollers and raceways in the contact zones and acting on a raceway are so directed that they counteract the axial load carried by said raceway. In accordance with the embodiment of the invention illustrated in FIGS. 3 and 4, this is achieved by means of a cage having portions which continuously engage each of the rollers at opposite axial end faces at points X and Y on radially opposite sides of the rotational axis $A_r$ of each roller. More specifically, in the present instance, the cage comprises a pair of annular members 60 and 62 respectively which have a plurality of circumferentially spaced axially extending cross pieces or webs 64 defining a plurality of pockets 66 for the rollers. The annular members 60,62 are formed with segments 68 and 70 in each pocket which confront and engage the axial end face of the rollers at the points X and Y radially on opposite sides of the rotational axis $A_r$ of the roller. In the present instance, the segment 68 engages one axial end face of the roller radially inwardly of the roller axis $A_r$ and the segment 70 engages the opposite end face of the roller radially outwardly of the roller axis $A_r$. The distance D between the segments 68 and 70 is preferably slightly less than the maximum axial dimension L of the roller. Thus, the cage presses lightly against the rollers at these points X and Y and friction forces $f_x$ and $f_y$ develop which have directions as indicated in FIG. 3 of the drawings. These forces $f_x$ and $f_y$ produce a positive moment on the rollers whereby the friction force components $f_a$ and $f_c$ in the axial direction arising between the rollers and raceways are so directed that they counteract the axial load P carried by the rollers. It is noted that this cage arrangement causes the rollers to assume positive or non-negative skew angle irrespective of the direction of rolling of the rollers. In other words, if the relative rotation of the rings is reversed to effect rotation of the rollers in an opposite direction to that shown, that is, in a clockwise direction, the friction forces $f_x$ and $f_y$ developed at the contact points X and Y between the rolling elements and the cage produces a positive moment on the rollers and also positions the rolling elements at a positive skew angle $\beta$, that is, one wherein the axial component of the friction forces $f_a$ and $f_c$ between the rollers and inner and outer rings counteracts the axial component of the external load carried by the respective rings.

Figure 6:
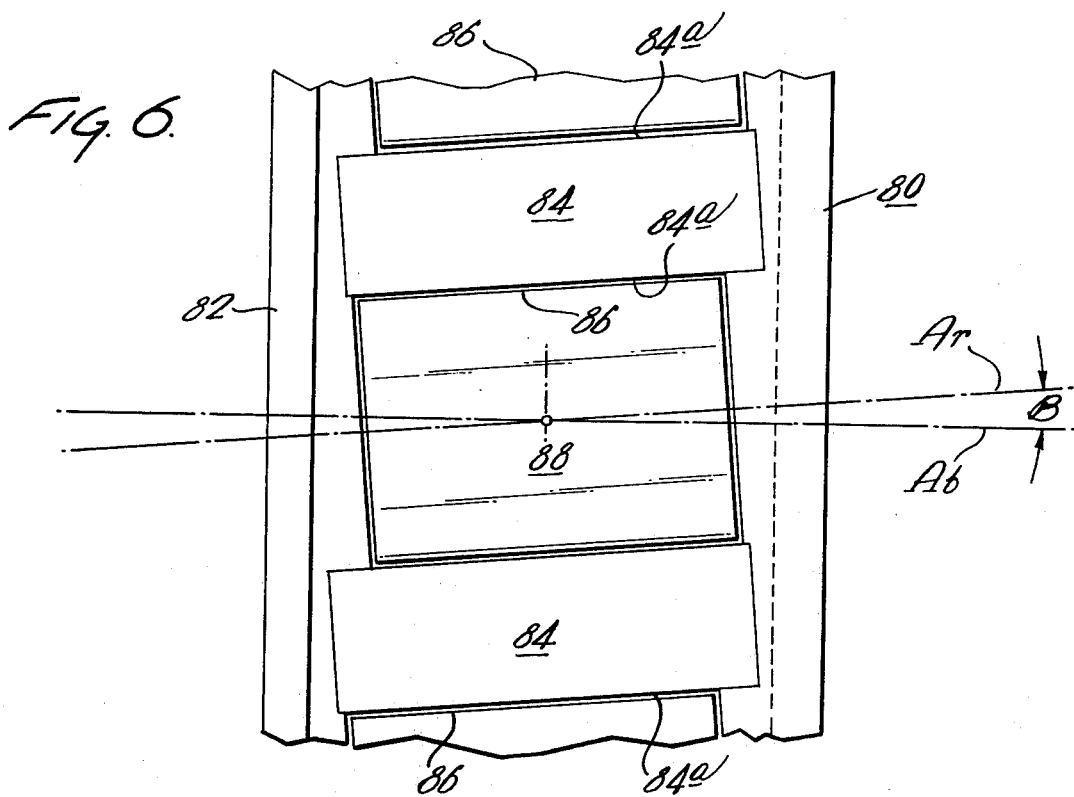
FIG. 6 is a fragmentary plan view showing a roller of the bearing assembly of FIG. 5 in a controlled skewed position.
Figure 5:
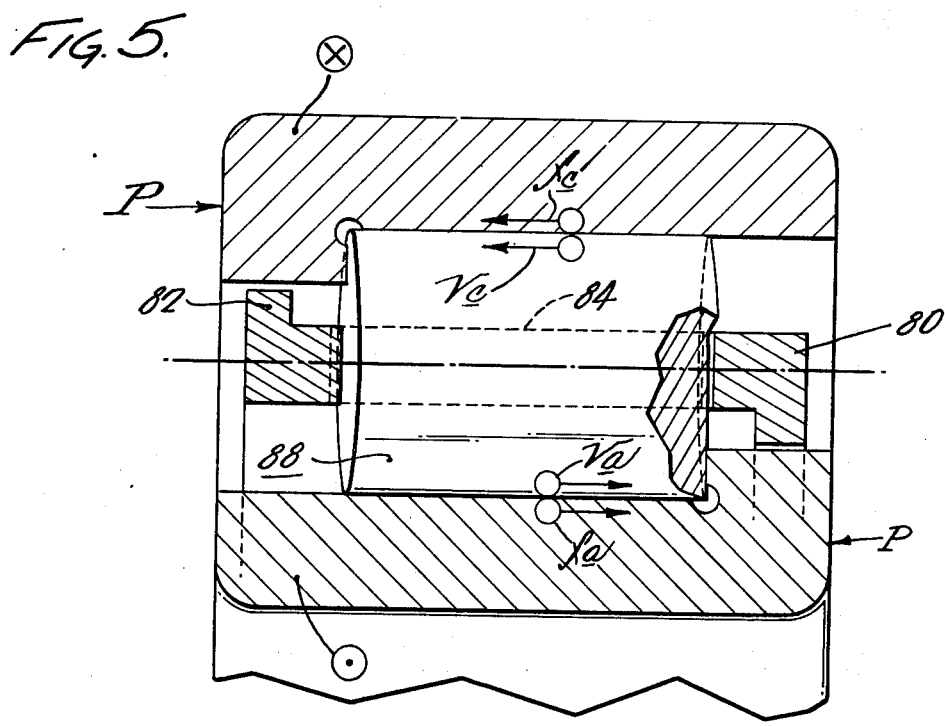
FIG. 5 is a sectional view of a cylindrical roller bearing assembly incorporating a second embodiment of cage skew control means.

There is illustrated in FIGS. 5 and 6 still another embodiment of a roller bearing in accordance with the present invention wherein cage control means is provided for effecting a positive skew moment on the rollers. In this instance the cage also includes a pair of annular members 80 and 82, respectively connected by a plurality of circumferentially spaced cross pieces or webs 84 defining in the illustrated embodiment rectangular roller pockets 86 for the rollers. In the present instance, however, the roller pocket 86 is oriented to dispose each rolling element so that its axis of rotation $A_r$ is fixed at a predetermined angle relative to the axis of the bearing $A_b$ (see FIG. 6). To this end the side edges 84$^a$ of the cross pieces defining each pocket are angularly disposed relative to the bearing axis $A_b$. The side edges 84$^a$ are disposed at an angle $\beta$ which is the desired positive skew angle for the rollers and which is preferably in a range of between 0°–2°. It has been found that at positive skew angles beyond 2° friction forces increase but at a slower rate than corresponding negative skew angles and that acceptable performance could be obtained with positive skew angles up to about 6°. When the rollers are disposed in this position by the cage, the axial component of the friction forces between the roller and the rings counteract the applied load for a bearing assembly wherein the relative rotation of the rings are as indicated in the drawings. It is noted that if the relative direction of rotation of the rings is reversed and the rollers rotate in a direction opposite to that shown in FIG. 5, then the cage pockets are formed so that they are oriented at an angle opposite to that shown in FIG. 6.

What is claimed is:

1. A bearing comprising inner and outer members having inner and outer raceways spaced apart to define an annular space therebetween, a plurality of rolling elements in said annular space engaging said raceways at contact zones, operation of said bearing under externally applied load having a radial and axial component normally producing forces creating a negative moment on the rolling elements tending to dispose said rolling elements at a negative skew angle relative to the axis of the bearing wherein the friction force components in the axial direction arising in said contact zones of each raceway act in the same direction as the axial component of the externally applied load on the respective raceways, a cage for circumferentially spacing said rolling elements, the improvement comprising skew control means associated with said cage operable during operation of the bearing for a predetermined relative movement of said members and said rolling elements, to cause all the rolling elements in the load zone to assume a non-negative skew angle within a predetermined angular range, said rolling elements having a finite skew angle when the axis of the rolling element and the axis of the bearing are not coplanar, said means engageable with the rolling elements at predetermined locations during operation of the bearing to develop forces between said cage and rolling elements at said predetermined locations to maintain a non-negatively skewed position of the rolling elements, said rolling elements being positively skewed when the friction force components in the axial direction arising in a contact zone between said rolling elements and raceways and acting on a raceway are so directed that they oppose the axial component of the externally applied load carried by said raceway.

2. A bearing as claimed in claim 1, wherein said cage means includes segments engagable with the axial end face of each of said rollers, the segment of said cage means engaging one axial end face of each roller radially to one side of the axis or rotation of said roller and the segment of said cage means engaging the opposite axial end face of said roller radially to the opposite side of the axis of rotation of said roller.

3. A bearing as claimed in claim 1 wherein said cage means includes a pocket for each of said rollers of generally rectangular configuration and wherein the side edges of each pocket confronting the peripheral surface of the roller are angularly disposed relative to the bearing axis to dispose the rolling elements at the desired non-negative skew angle.

4. A bearing as claimed in claim 1 wherein said cage means includes a pocket for each of said rollers of a shape generally conforming to the roller profile and operable to dispose the rolling elements at the desired non-negative skew angle.

5. A bearing as claimed in claim 1 wherein said skew angle of said rolling elements is positive.

* * * * *